July 22, 1952 N. E. DIETZ 2,604,617
AIR SEAL CONTROL

Filed Aug. 11, 1949 2 SHEETS—SHEET 1

INVENTOR.
NORMAN E. DIETZ
BY
Otto Moeller
Attorney

Patented July 22, 1952

2,604,617

UNITED STATES PATENT OFFICE 2,604,617

AIR SEAL CONTROL

Norman E. Dietz, York, Pa., assignor to Read Standard Corporation, a corporation of Delaware Application August 11, 1949, Serial No. 109,758

2 Claims. (Cl. 318—520)

1

This invention relates to mixers and the like wherein a pressure air seal is provided for sealing the agitator shafts thereof where they project through the ends of the mixer bowl, and pertains more particularly to means for controlling the application of pressure.

Mixing machines of the horizontal type, dough mixing machines for example, are provided with a tiltable bowl, U-shaped in transverse cross section, in which is disposed an agitator mounted for rotation on a shaft, the ends of which shaft project through the ends of the mixer bowl.

The ingredients introduced into the mixing bowl include liquid as well as dry materials and it is essential to have a tight seal at the clearance around the agitator shaft where it extends through the end walls of the mixing bowl, in order to prevent leakage of liquid. It has previously been proposed, as in United States Patent No. 2,340,022 issued January 25, 1944 to T. J. Shellenberger, to provide a pressure air seal for the agitator shafts at the joints between the shafts and the journals therefor.

When control of the operation of the blower motor for the air seals is left to the attendant of the mixer, it is at necessary times not always placed in operation because of oversight or other causes, and such controls as have been used are inadequate to insure pressure for sealing at all essential times, resulting in water or other liquid getting out of the mixing chamber along the agitator shaft.

It is the primary object of this invention to overcome such objections by the provision of novel control means whereby the blower motor is automatically placed in operation to supply air under pressure to the shaft sealing chamber when the mixing bowl is initially closed, or in other words when it is placed in its mixing position; to thereafter retain the pressure seal in functioning condition regardless of how often the bowl is tilted to open position and returned to closed position; and to interrupt functioning of the pressure air seal after once being started only by tilting the bowl to its open position and manually pressing a stop button in the electrical control circuit.

Figure 1:
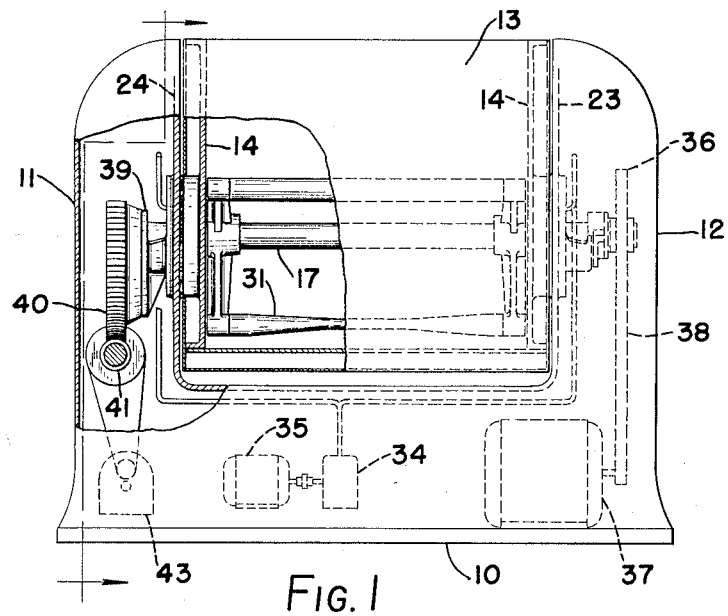

Other objects and advantages will be apparent from the following detailed description of a preferred embodiment of the invention, reference being had to the accompanying drawings, in which:

Figure 1 is a view in elevation, with parts broken away and shown in section, of a dough

Figure 3:
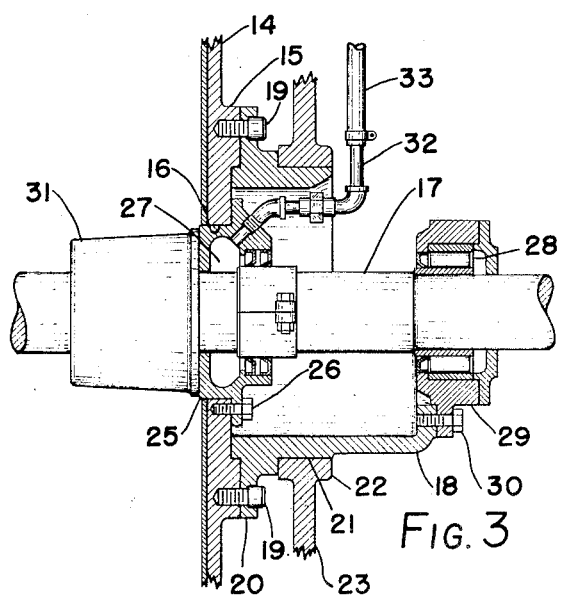
Figure 2:
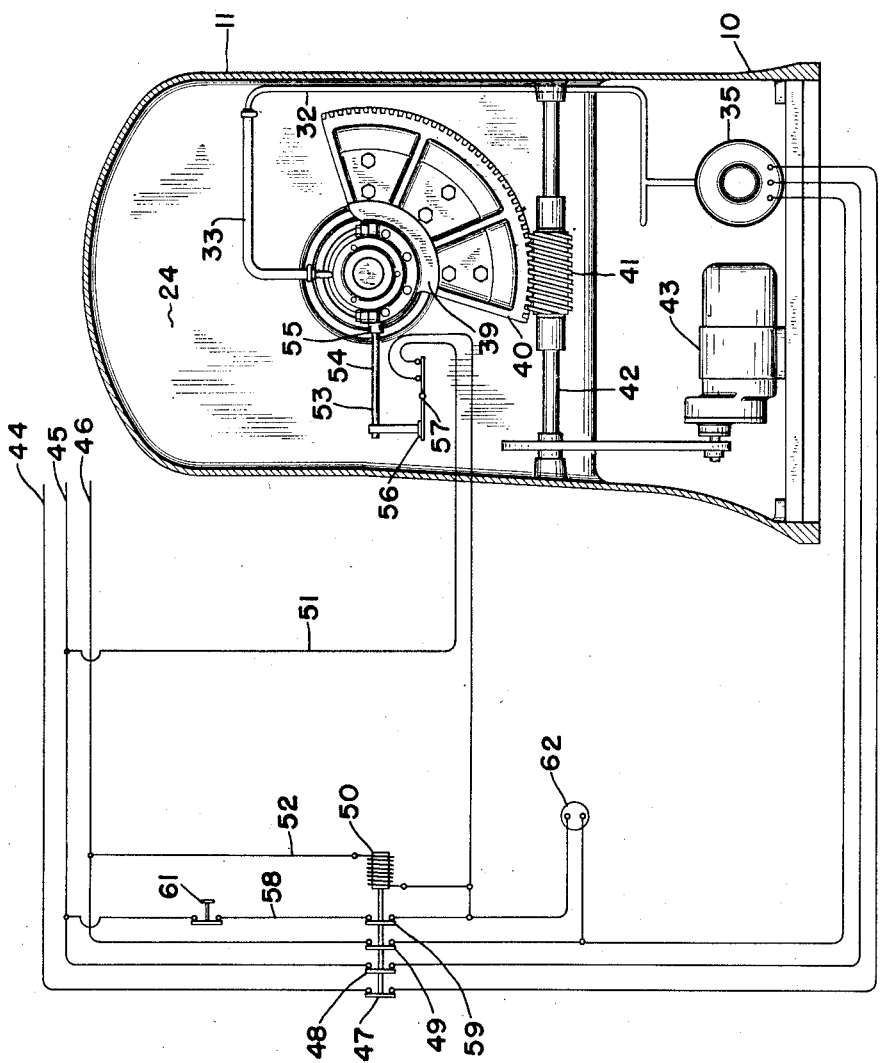

2 mixing machine embodying the present invention;

Figure 2 is a sectional view of the mixer taken on the line 2—2 of Figure 1, with a diagrammatical representation of the control system for the pressure air seal shown applied thereto; and Figure 3 is an enlarged section of a portion of the dough mixing machine showing the pressure sealing construction for the agitator shaft.

The invention is here shown and described in connection with a dough mixer, but it is obviously applicable to various forms of mixing and other devices.

Referring to the drawings, the dough mixing machine comprises a casing consisting of a base 10 and hollow upright standards 11 and 12. Between the standards 11 and 12 and above the base 10 is a mixing bowl 13 of well known construction, mounted to be tilted from its mixing position, as shown in Figure 1, to permit discharge of the dough.

In order to tiltably mount the bowl 13, each end wall 14 is provided with a boss 15 having an opening 16 therein of considerably larger diameter than the diameter of the agitator shaft 17.

A cylindrical housing 18 open at its inner end has a diameter larger than the diameter of the opening 16 and is arranged with its inner end abutting the end wall 14 of the bowl 13. The housing 18 is rigidly secured to the end wall 14 by suitable means, as by bolts 19, extending through the annular flange 20 on the inner side of the housing 18 and into the boss 15.

A portion of the outer circumference of the housing 18 is arranged to form a trunnion 21 for the bowl 13. The trunnion 21 is journaled in a bearing 22 mounted in or formed with the inner upright wall 23 of the standard 12. The inner upright wall 24 of the standard 11 is provided with a bearing similar to bearing 22 and the left side of the bowl 13, as shown in Figure 1, is provided with a similar arrangement of parts at the right side.

A cylindrical sealing unit or casing 25 surrounds the agitator shaft 17, and closes the annular opening 16 between the shaft 17 and the portion of the mixer and wall 14 that defines the opening 16. The casing 25 is rigidly secured to the mixer end wall 14 by means of bolts 26. It is formed to provide an annular chamber 27 surrounding the shaft 17. In order to permit free rotation of the shaft 17, a little clearance is provided between the casing 25 and the shaft 17.

The outer end of the agitator shaft 17 is journaled in a roller bearing 28 mounted in an annular plate 29 fastened to the outer end of the housing 18 by bolts 30. Disposed within the bowl 13 and mounted for rotation with shaft 17 is an agitator 31 of well known type.

Air under pressure is introduced into the chamber 27 of sealing casing 25 by piping 32 including a flexible section 33 to permit tilting of the bowl 13. A blower 34 operated by a motor 35, mounted in the base 10, as shown in Figure 1, supplies air under pressure. By introducing air into the chamber 27 at a pressure greater than that within the mixing bowl 13, the liquid in the bowl is prevented from leaking outwardly through the clearance between the shaft 17 and the surrounding edges of the sealing casing 25.

The end of the agitator shaft 17, at the right side as viewed in Figure 1, carries a pulley 36 which is connected to a motor 37 in the base 10 by means of a belt 38, whereby motion is transmitted to the agitator 31.

The housing 18 on the left side of the mixer, as viewed in Figure 1, is provided with a segmental outwardly projecting flange 39 to which is secured a sector gear 40. The sector gear 40 meshes with a worm 41 mounted on a shaft 42 which is journaled at its ends in opposite side walls of the standard 11. A motor 43 mounted in the base 10 is operatively connected with shaft 42 for rotating the same. The worm 41 drives the sector gear 40 for tilting the mixing bowl 13. Suitable electrical control equipment including limit switches well known in the art, and therefore not shown, are provided for closing and opening the bowl 13.

The control system for the blower motor 35 for effecting and controlling the functioning of the pressure air seal will be described in detail. Current is preferably supplied to motor 35 through alternating current supply lines 44, 45 and 46 in which lines are interposed normally open switch contactors 47, 48 and 49, respectively. These switches are closed through energization of an electromagnetic coil 50 disposed in a starting circuit including a line 51 connecting one of the current supply lines, as 45, with one terminal of the coil 50 and a line 52 connecting another of the current supply lines, as 46, with the other terminal of the coil 50.

Interposed in the line 51 is a limit switch device 53, its switch 57 being arranged to be open when the bowl 13 is in its tilted or open position whereby the circuit for the coil 50 is broken. The switch 57 of the limit switch device 53 is arranged to be closed when the bowl 13 has been rotated to its fully closed position thereby closing the circuit to the coil 50, which on becoming energized closes the switch contactors 47, 48 and 49 and initiates operation of the blower motor 35.

The limit switch device 53 preferably includes a rod 54 which is threaded in a boss 55 on the housing 18. A shoe 56 on the free end of the rod 54 closes the normally open switch 57 when the bowl 13 has reached its closing limit.

The coil 50 is also included in a maintaining circuit comprising the aforementioned line 52 connecting one terminal of the coil 50 and one of the supply lines, as 46, and a line 58 connecting the other terminal of the coil 50 with another of the supply lines, as 45. In the line 58 of the maintaining circuit is a switch contactor 59 arranged for operation along with the contactors 47, 48 and 49, being similarly normally open and being closed upon energization of coil 50.

Now, assuming that the mixer is to be placed in operation by the attendant at the beginning of the work shift, he operates the bowl tilting motor 43 to close the bowl. A limit switch arrangement of well known design, not shown, automatically stops motor 43 when the bowl 13 has reached its closed position. Closing of the bowl 13, as above described, causes limit switch device 53 to close switch 57 completing the circuit to the electromagnetic coil 50. Whereupon, energization of coil 50 closes the contactors 47, 48 and 49 completing the circuit to blower motor 35 and air under pressure is supplied to the pressure air sealing chamber 27.

At the same time, energization of coil 50 closes the contactor 59 completing the maintaining circuit to the electromagnetic coil 50. It is apparent that when during the work shift the attendant tilts the bowl 13 to empty a batch of mixed dough prior to mixing of a new batch, the switch 57 of limit switch 53 opens, breaking the starting circuit in line 51 to the coil 50. But for the maintaining circuit to the coil 50 through lines 58, 52, the coil 50 would be de-energized and the normally open contactors 47, 48 and 49 would open, breaking the circuit to the blower motor 35 and cutting off the supply of air under pressure to sealing chamber 27.

As above stated, even though the circuit through limit switch device 53 is broken upon tilting the bowl 13, the maintaining circuit through lines 58, 52 energizes coil 50 and retains contactors 47, 48, 49 and 59 closed, whereby the blower motor 35 continues to run. Thus, no matter how many times during a work shift that the bowl 13 is tilted, the blower motor 35 continues to operate, supplying air under pressure to the sealing chamber 27.

In order to stop the blower motor 35 at the end of a work shift, the attendant must first tilt the bowl to open position and then manually open a normally closed switch 61 in the line 58 of the maintaining circuit to the coil 50. Both the starting and maintaining circuits to the coil 50 being then broken, the coil 50 is de-energized, permitting the normally open contactors 47, 48, 49 and 59 to open, whereby blower motor 35 stops.

The mixer is then in readiness for the next shift's operation, and as above explained, the blower motor automatically starts to function upon closing of the bowl 13 through the starting circuit controlled by the limit switch device 53.

A pilot light 62 is preferably provided in the circuit, one terminal being connected with supply line 46 between the contactor 49 and the blower motor 35 and the other terminal being connected with supply line 45 through contactor 59. Thus when contactors 47, 48, 49 and 59 are closed, which is the running position for the blower motor, the pilot light will be lighted and when these contactors are open, which is the non-running position for the blower motor, the circuit to the pilot light is broken. Visual means is thus provided indicating to the attendant whether or not the blower motor is operating.

I claim:

1. A control system for supplying air to a pressure seal for the agitator shaft of a tiltable mixing bowl comprising a blower motor, a running circuit for the motor, an electromagnetic switch for closing the running circuit including a coil, a starting circuit for initially energizing said coil including a limit switch device responsive to positioning of said bowl and arranged to complete said starting circuit only when said bowl is in its righted position, a maintaining circuit for energizing said coil including a normally open switch arranged to be closed upon initial energization of said coil by said starting circuit for maintaining energization of said coil independently of said limit switch controlled starting circuit after the starting circuit has initially energized said coil, and a manually operated normally closed switch in said maintaining circuit for breaking said last named circuit, the portion of said maintaining circuit in which said normally closed switch is disposed being dissociated from said starting circuit, whereby said blower motor can only be stopped by moving said bowl from its righted position and opening said manually operated switch to break both said starting and maintaining circuits.

2. A control system for supplying air to a pressure seal for the agitator shaft of a tiltable mixing bowl, comprising a blower motor, a running circuit for the motor, an electromagnetic switch for closing the running circuit including a coil, a starting circuit for energizing said coil including a normally open switch, means responsive to positioning of said bowl to close said normally open switch only when the bowl is in its righted position, a maintaining circuit for energizing said coil including a normally open switch arranged to be closed upon energization of said coil by said starting circuit for maintaining energization of said coil independently of said starting circuit after said starting circuit has initially energized said coil, and a normally closed switch in said maintaining circuit for breaking said last named circuit, the portion of said maintaining circuit in which said normally closed switch is disposed being dissociated from said starting circuit, whereby said blower motor can only be stopped by moving said bowl from its righted position and opening said normally closed switch to break both said starting and maintaining circuits.

NORMAN E. DIETZ.

REFERENCES CITED

The following references are of record in the file of this patent:

UNITED STATES PATENTS

| Number | Name | Date |
|---|---|---|
| 1,163,150 | Horton | Dec. 7, 1915 |
| 1,454,022 | Whittingham | May 1, 1923 |
| 1,775,730 | McNicol | Sept. 16, 1930 |
| 2,277,578 | Booth | Mar. 24, 1942 |
| 2,329,357 | Mowery et al. | Sept. 14, 1943 |
| 2,466,355 | Baker | Apr. 5, 1949 |